(12) United States Patent
Ayyadurai

(10) Patent No.: US 6,668,281 B1
(45) Date of Patent: Dec. 23, 2003

(54) RELATIONSHIP MANAGEMENT SYSTEM AND METHOD USING ASYNCHRONOUS ELECTRONIC MESSAGING

(75) Inventor: V. A. Shiva Ayyadurai, Belmont, MA (US)

(73) Assignee: General Interactive, Inc., DE (US)

( * ) Notice: Subject to any disclaimer, the term of this patent is extended or adjusted under 35 U.S.C. 154(b) by 0 days.

(21) Appl. No.: 09/329,500

(22) Filed: Jun. 10, 1999

(51) Int. Cl.[7] .............................................. G06F 15/173
(52) U.S. Cl. ........................ 709/223; 709/201; 709/206; 379/88.05; 379/88.13; 379/88.22; 379/93.24
(58) Field of Search ................................. 709/223, 203, 709/206, 201, 200, 207, 227, 226, 217, 238, 246; 379/93.24, 88.13, 88.22, 88.05, 100.01; 707/1, 500; 455/412; 382/100, 137

(56) References Cited

U.S. PATENT DOCUMENTS

| | | | |
|---|---|---|---|
| 5,619,648 A | * 4/1997 | Canale et al. | 709/206 |
| 5,627,764 A | * 5/1997 | Schutzman et al. | 709/207 |
| 5,754,857 A | * 5/1998 | Gadol | 709/203 |
| 5,832,100 A | * 11/1998 | Lawton et al. | 382/100 |
| 5,867,799 A | * 2/1999 | Lang et al. | 707/1 |
| 5,903,877 A | * 5/1999 | Berkowitz et al. | 705/26 |
| 5,960,404 A | * 9/1999 | Chaar et al. | 705/8 |
| 5,987,422 A | * 11/1999 | Buzsaki | 705/9 |
| 6,038,541 A | * 3/2000 | Tokuda et al. | 705/8 |
| 6,115,646 A | * 9/2000 | Fiszman et al. | 700/181 |
| 6,138,088 A | * 10/2000 | Goeser | 704/9 |
| 6,170,002 B1 | * 1/2001 | Ouchi | 709/206 |
| 6,192,354 B1 | * 2/2001 | Bigus et al. | 706/46 |
| 6,282,565 B1 | * 8/2001 | Shaw et al. | 709/206 |
| 6,301,608 B1 | * 10/2001 | Rochkind | 709/206 |
| 6,301,621 B1 | * 10/2001 | Haverstock et al. | 709/246 |
| 6,314,425 B1 | * 11/2001 | Serbinis et al. | 707/10 |
| 6,356,936 B1 | * 3/2002 | Donoho et al. | 709/206 |

OTHER PUBLICATIONS

Clarence A. Ellis et al., Office InformationSystems and Computer Science; computing Surveys, vol. 12, No. 1, Mar. 1980, pp. 27–60.*

Douglas Siviter et al., Harnessing technology for effective inter– and intr–institutional collaboration; ITiCSE'97; vol. 25 Issue 4, pp. 70–93.*

"About Notes R5", IBM Corporation, downloaded on May 23, 2002 from http://www.lotus.com, 3 pages.

"About Domino", IBM Corporation, downloaded on May 23, 2002 from http://www.lotus.com, 2 pages.

* cited by examiner

Primary Examiner—Frantz B. Jean
(74) Attorney, Agent, or Firm—Burns, Doane, Swecker & Mathis, LLP

(57) ABSTRACT

A system and method for automating workflow related to the reception, review, distribution, and disposition of client contact through electronic communications. All types of received contact messages are converted to e-mail messages and automatically processed using natural language processing to generate one or more replies. The original message and the reply(ies) are distributed to one or more workflow automation databases, such as customer care databases, direct mail campaign databases, and sales lead databases, for transmission of the reply(ies) to the originator. The method can be realized in a single database or across multiple databases, located on a single computer platform or distributed across multiple networked computer platforms.

16 Claims, 1 Drawing Sheet

RELATIONSHIP MANAGEMENT SYSTEM AND METHOD USING ASYNCHRONOUS ELECTRONIC MESSAGING

CROSS-REFERENCE TO RELATED APPLICATIONS

This application is a related to U.S application Ser. No. 09/325,111, filed on Jun. 3, 1999, by V. A. Shiva Ayyadurai. This application is also related to U.S. application Ser. No. 09/323,312, filed on Jun. 1, 1999, by V. A. Shiva Ayyadurai.

TECHNICAL FIELD OF THE INVENTION

This invention pertains to the arts of contact management and corporate-to-client relationship management via electronic messaging means, such as fax and electronic mail. This invention also relates to workflow automation as it applies to client-to-provider communications as well as interdepartmental communications.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

The related U.S. patent applications, Ser. Nos. 09/323,312 and 09/325,111, filed on Jun. 1, 1999, and Jun. 3, 1999, respectively, both by V. A. Shiva Ayyadurai, are incorporated herein by reference in their entirety, including drawings, and hereby are made a part of this application.

BACKGROUND OF THE INVENTION

Electronic mail and facsimile ("fax") messaging have become critical tools of everyday personal and business life. As companies have recognized the growing trend of clients wanting to conduct business by electronic commerce and electronic messaging, they have found the need for sophisticated technology to automate and handle the volume of messages they receive. Thus, the accuracy and speed at which companies handle their electronic messages have become an integral part of the perception of responsiveness and non-responsiveness by their clients.

Traditionally, all of the electronic messages are received in a general repository, or "mailbox", and reviewed by human agents for their content, at which time a determination of the correct disposition of the email is made. This may involve sending the author a standard reply, and/or copying or fowarding the e-mail to one or more divisions, departments, or individuals within the organization for further handling. In the later case where multiple parties must be consulted, the consolidation of replies from all of the parties can be cumbersome and overwhelming, given the volume of messages to be handled.

Systems known in the art provide some methods for distributing workflow automation over a networked system of computing platforms. One such method is described in U.S. Pat. No. 5,754,857, by Steven D. Gadol. Other systems, such as IBM's Lotus Notes product, are platforms on which workflow and e-mail handling can be automated with custom programming. While these systems provide methods of distributing processing tasks among multiple networked computers, it does not automate work on a message context-sensitive or content-intelligent basis. Consequently, a need exists for a human operator or operators of the system to read and review text-based messages, such as e-mail, to complete the required workflow process to manage customer contacts and relationships.

Many e-mail client programs allow auto-reply, auto-forward, and auto-delete capabilities based on "hard rules" a user can set. For example, a user can set a rule such as "IF SENDER=my_boss@our_company.com, THEN FORWARD TO my_vacation_home@an_isp_faraway.net".

These kinds of simple and hard rules are not appropriate for automating a wide array of possible reply and forward functions based on content of e-mail received at a corporate level. They do not provide enough logic, reply generation, and adaption to cover the varieties and combinations of issues and requests presented in electronic messages directed toward corporate sales, customer service, and investor relations departments.

Contact management products, such as Act! From Symantec Corporation, are available to assist a user in tracking, storing, and recalling "relationship information", such as contact details for clients, their birthdays, and their hobbies. Available contact management products provide automated reminders to the user at certain times and dates. Additionally, they typically provide reminders of the subject of the last conversation. They do not provide workflow automation to accomplish relationship and contact management through a large organization, including automated classification and routing of messages and replies based on the content of messages from clients.

While these products may form a part of or entire platforms for the implementation of the contact and relationship management workflow automation system invention disclosed herein, several critical functions are not available to fulfill the needs in the art.

Therefore, there exists a need in the art for workflow automation system which receives, manages, routes, responds to, and tracks inbound electronic messages.

Further, there exists a need in the art for this system to intelligently automate the classification and response process based on the content of the messages.

Finally, there exists a need in the art for this system to provide for executing outbound message campaigns and promotions.

SUMMARY OF THE INVENTION

The invention disclosed herein provides an automated system for managing large volumes of electronic message communications, such as fax and e-mail, between companies and organizations, and their clients. Because these communications are integral to the maintenance of the relationships with a client base, the invention enables quick and accurate response to client requests through intelligent handling of their messages.

BRIEF DESCRIPTION OF THE DRAWINGS

For a more complete understanding of the invention, the following disclosure can be taken in conjunction with the presented FIG. 1.

Further, the invention enables accurate and non-intrusive contact campaigns which are initiated by the organization or company, such as outbound e-mail campaigns to select subsets of the entire client base, members of the subset having indicated interest in the subject of the campaign during prior contacts with the company or organization.

Figure 1:
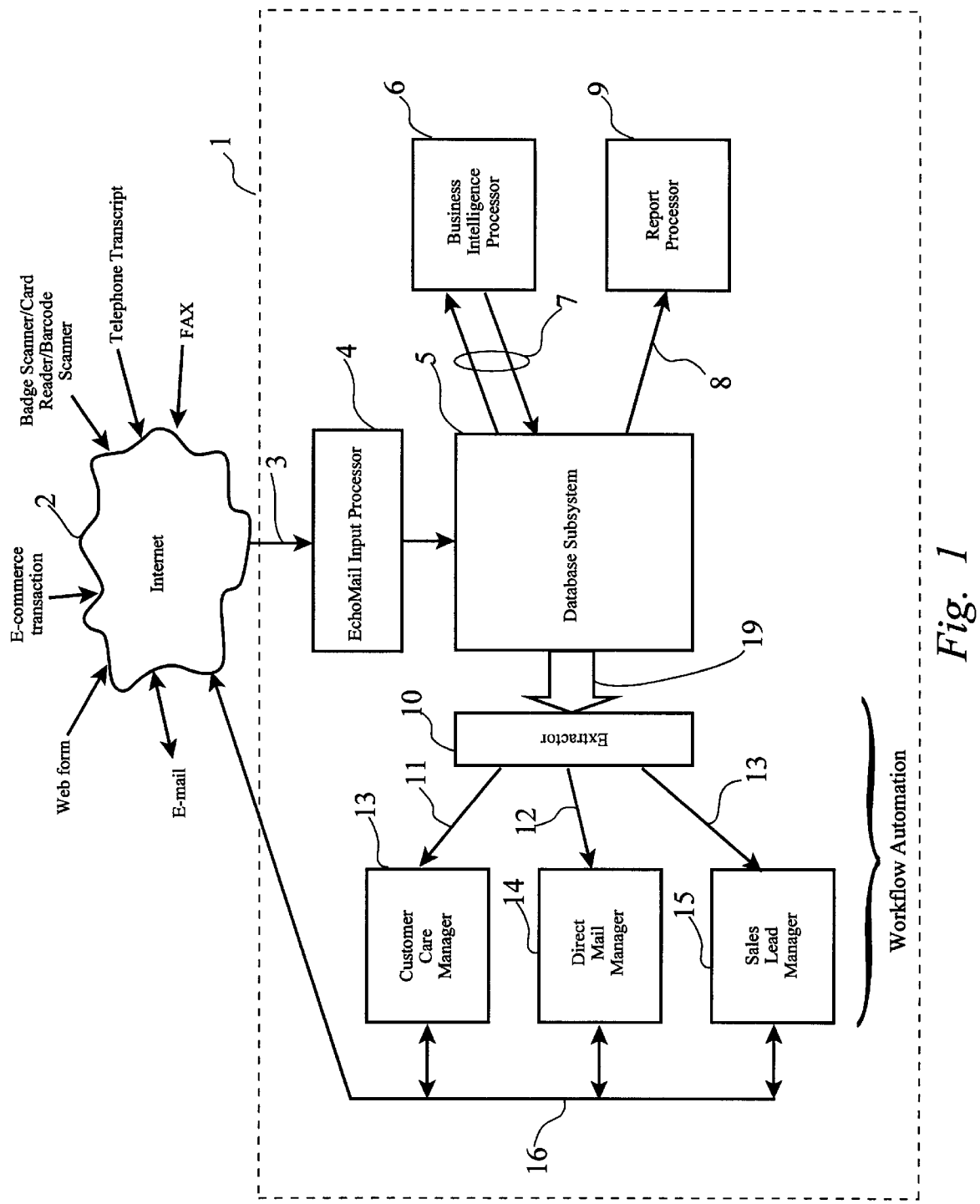

In general, the system receives multiple forms of electronic communication as input, such as e-mail, fax, telephone transcripts, data from card readers and trade show badge scanners, Internet web forms, and e-commerce transactions. These input messages are reduced to a common format, and placed in a common, central database. An intelligent message processor, as described in the parent applications for patent, analyzes the new messages, and creates replies based on the content of those messages.

An extractor then selectively moves original messages and replies from the central database to one or more database and communication means, such as a customer care manager, a direct mail manager, and a sales lead manager. Each of the database manager functions then operates on the data to perform communications and relationship management, such as sending the reply, automatically generating follow-up messages, and initiating direct contact campaigns.

DETAILED DESCRIPTION OF THE INVENTION

The following disclosure, when taken in conjunction with the presented figure, sets forth the invention previously described in the SUMMARY OF THE INVENTION.

Turning to FIG. 1, many forms of contact with a company or organization can be supported by the system. Some forms of electronic messages, such as e-mail, web forms and electronic commerce, are received directly from the source via a network, such as the Internet (2).

Operators can type transcripts of telephone calls into electronic forms, and submit those forms to the system as well. Documents received by facsimile can be subjected to optical character recognition ("OCR") to render text-based electronic messages, which are then forwarded to the system.

Another interesting use for the system is collection and processing of data collected during contacts at trade show booths. It is typical for trade show attendees to be given electronic badges or cards which contain their name, address, company name, e-mail, and various other data, or a unique identifier which can be related to this information in a database. When an attendee visits a booth, the company representative can scan the card or badge to quickly collect the data and add the person to their "mailing list". In this case, the booth attendant or the attendee may also complete a questionnaire about the attendee's interests, questions or requests. This questionnaire can be electronically processed, through OCR or other means, into an electronic text-based message incorporating the attendee's identity information, and submitted to the system for processing.

All of these contact messages are received (3) into the invention (1) through an input processor (4), which converts all received messages to Simple Mail Transfer Protocol ("SMTP") e-mail messages. All of the received e-mail messages are then stored in a database subsystem (5) for immediate and/or later handling by the system. In the preferred embodiment, an intelligent processor (6) interfaces to the database (5) through means such as an open database interface standard ("ODBC") or other appropriate database application program interface ("API"). The intelligent processor (6) preferably employs techniques such as natural language processing and learning neural networks to analyze the message and compose a proposed reply, such as in the system and methods described in the parent patent application, also known as the General Interface EchoMail Xiva™ technology. The intelligent processor (6) then adds to the database subsystem (5) the proposed reply or replies for later or immediate handling by the system. The techniques employed by the intelligent processor (6) may be characterized as unsupervised classification techniques, and are more fully described in the aforementioned applications. They include feature extraction methods, which can be any one or multiple methods of pattern recognition, such as keyword analysis, morphology, natural language processing, thesauri, co-occurrence statistics, syllabic analysis and word analysis. The feature extraction methods result in several output signals, including keyword frequencies, co-occurrence statistics, a dimensionally-reduced representation of the keyword frequencies, phoneme frequencies, structural pattern statistics for sentences, paragraphs, and pages, estimated education level of the author based on word choices and complexity of sentence structure, and customer type.

Extractor (10) then selects (19) and moves (11, 12, 13) messages which are stored in the database subsystem (5) to other relationship database managers, such as a customer care manager (13), direct mail manager (14), and sales lead manager (15).

These database managers can then operate on the subsets of messages from the database subsystem to send replies to the message originator, schedule follow-up messages to be sent, and include the originator in future outbound direct contact campaigns. All replies (16) and contact are preferably made with the originator via standard e-mail messaging means, such as the Internet (2). This reduces the cost of the reply, and also allows for immediate delivery of the reply.

For example, assume a received message contains two issues: (1) a request for product information, and (2) a complaint about quality of another product from the company. Further assume for this example that the message originates as an e-mail message. The original message would be received by the input processor (4) and stored in the database subsystem (5). The intelligent processor (6) would retrieve the message, analyze the contents and detect the two issues presented, and compose a proposed reply message containing an apology for the quality issue and a promise that customer service will call the originator, and may contain the product information requested. The reply message is then stored in the database subsystem (5), and selected by the extractor (10). The extractor (10) then moves the message to the customer care database manager (13) and the sales lead database manager (14) for processing. Finally, the reply message would be transmitted (16) to the originator via e-mail, and follow-up contact, such as additional e-mail or telephone calls, would be scheduled by the database managers.

In a preferred embodiment, a report processor (9) is included in the system which can access (8) the database subsystem (5) to create standard and customized reports for management and operations use.

A preferred platform on which to implement this invention is IBM Lotus Notes. The Notes system provides a highly-programmable platform for managing multiple databases, distributed databases, and synchronization of databases. The Notes system is well known within the arts of electronic messaging and workflow automation, as well. The invention can be implemented though custom Notes applications for the methods described supra, with the addition of the intelligent processor (6) as a networked node or platform co-resident process. Using the Notes system, the various databases and database managers required for the system may be co-resident within one computer platform, or distributed across multiple networked computer platforms.

Even though the invention set forth herein has been described in detail related to a preferred embodiment, those skilled in the art will recognize that substitutions of some components and steps with equivalent alternative components and steps are possible without departing from the spirit and scope of the invention. For example, a different method of distributing databases other than the IBM Lotus Notes system could be employed, including but not limited to custom programming of multiple databases. Additionally, the database managers may be implemented in part or total by use of available products, such as Act! or Goldmine, where their databases are integrated or interfaced to the rest of the system of the invention.

What is claimed is:

1. A computer-implemented method for performing workflow comprising the steps of:
   (1) receiving a first message from an originator via an electronic reception means;
   (2) storing said first message in a first database subsystem;
   (3) processing said first message to generate a proposed reply message by performing unsupervised classification, said processing including assignment of properties of said message using natural language processing, said properties including an author attitude, issues presented, requests presented, an author type, and an author education level;
   (4) storing said reply message in said first database subsystem;
   (5) selecting and extracting said first message and said reply message from said first database subsystem;
   (6) transferring said extracted first message and extracted reply message to one or more workflow database subsystems; and
   (7) transmitting said reply message to said originator via an electronic transmission means.

2. The computer-implemented method for performing workflow of claim 1, wherein said electronic reception means comprises an e-mail reception means.

3. The computer-implemented method for performing workflow of claim 2, wherein said e-mail reception means further comprises a network and an e-mail transfer protocol.

4. The computer-implemented method for performing workflow of claim 3, wherein said e-mail transfer protocol further comprises the Simple Mail Transfer Protocol.

5. The computer-implemented method for performing workflow of claim 1, wherein said electronic transmission means comprises an e-mail transmission means.

6. The computer-implemented method for performing workflow of claim 5, wherein said e-mail transmission means further comprises a network and an e-mail transfer protocol.

7. The computer-implemented method for performing workflow of claim 6, wherein said e-mail transfer protocol further comprises the Simple Mail Transfer Protocol.

8. The computer-implemented method for performing workflow of claim 1, wherein said step of receiving a first message further comprises the step of converting a written document to an electronic text-based message.

9. The computer-implemented method for performing workflow of claim 8, wherein said step of converting a written document further comprises the step of Optical Character Recognition.

10. The computer-implemented method for performing workflow of claim 9, wherein said step of converting a written document further comprises the step of facsimile document transmission.

11. The computer-implemented method for performing workflow of claim 8, wherein said step of receiving a first message further comprises the step of converting an e-commerce transaction to an e-mail message.

12. The computer-implemented method for performing workflow of claim 8, wherein said step of receiving a first message further comprises the step of converting an Internet web form to an e-mail message.

13. The computer-implemented method for performing workflow of claim 8, wherein said step of receiving a first message furtherer comprises the step of converting data from a card reader to an e-mail message.

14. The computer-implemented method for performing workflow of claim 8, wherein said step of receiving a first message further comprises the step of converting barcode scanner data to an e-mail message.

15. The method of claim 1, said processing further including performing feature extraction to derive one or more output signals, said feature extraction being based on one or more of pattern recognition procedures selected from the group consisting essentially of keyword analysis, morphology, natural language processing, thesauri, co-occurrence statistics, syllabic analysis and word analysis.

16. The method of claim 15, wherein the one or more output signals are selected from the group consisting essentially of keyword frequencies, co-occurrence statistics, a dimensionally-reduced representation of the keyword frequencies, phoneme frequencies, structural pattern statistics for sentences, paragraphs, and pages, estimated education level of the author based on word choices and complexity of sentence structure, and customer type.

* * * * *